Patented May 8, 1923.

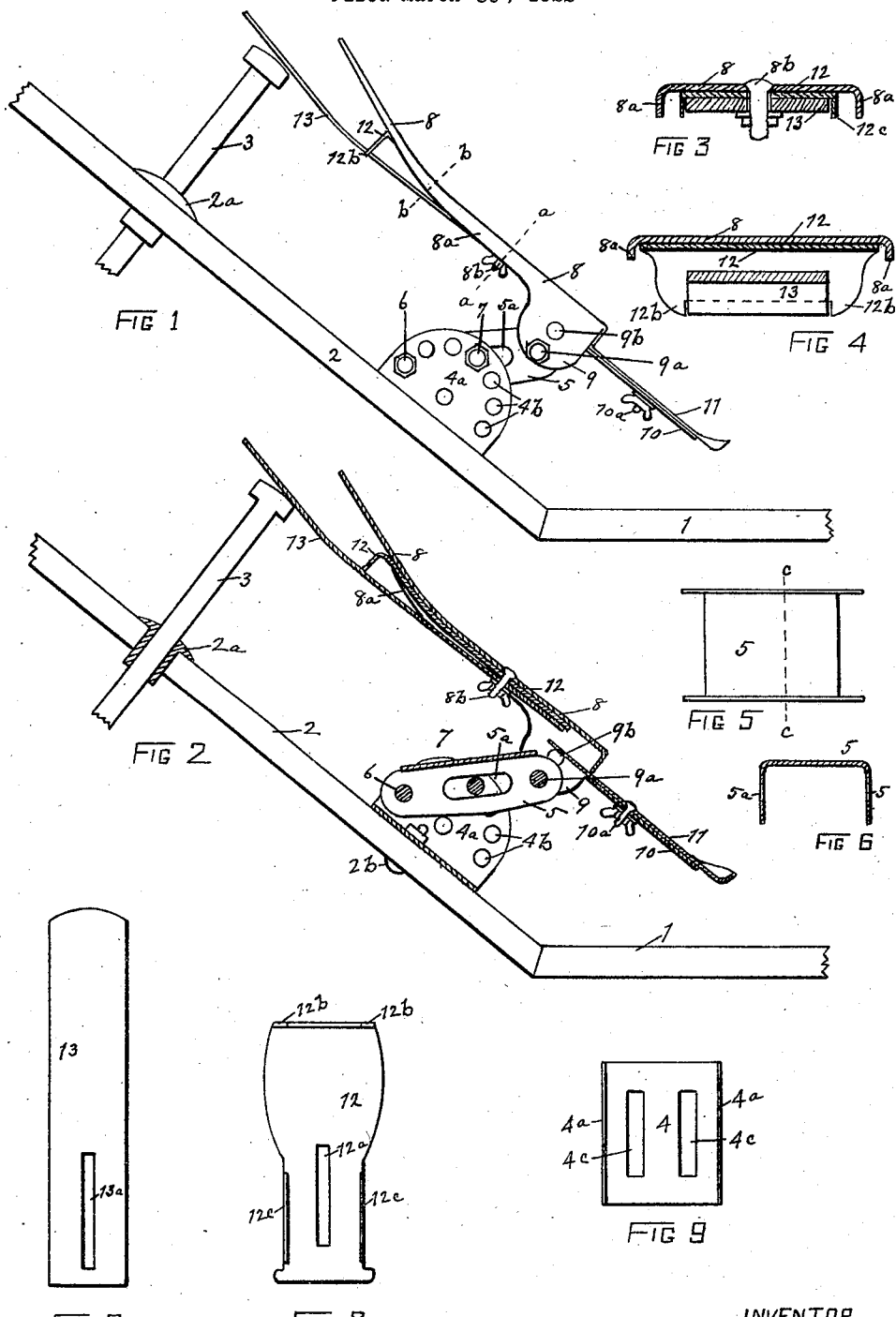

1,454,258

UNITED STATES PATENT OFFICE.

BENJAMIN D. ADAMS, OF GALESBURG, ILLINOIS.

AUTOMOBILE ACCELERATOR PEDAL.

Application filed March 30, 1922. Serial No. 548,115.

*To all whom it may concern:*

Be it known that I, BENJAMIN D. ADAMS, a citizen of the United States, residing at Galesburg, in the county of Knox and State of Illinois, have invented certain new and useful Improvements in Automobile Accelerator Pedals, of which the following is a specification.

My invention relates to pedals for use on automobiles that are provided with accelerators operable by foot power and has been devised as an improvement on my Patent Number 1,203,955, issued Nov. 7, 1916.

Means are provided on most automobiles for controlling, by foot power, the amount of gasoline allowed to enter the engine. Such means are commonly located at one definite distance from the chauffeur's seat and with no means of adjustment of said distance. Evidently any fixed location of the controlling means can not be equally convenient for all persons to reach from the seat. Furthermore the devices used, upon which pressure must be exerted in controlling the engine, do not afford a comfortable resting place for the foot being used to operate same.

My patented pedal, above referred to, partly overcame these difficulties. The object of my present invention is to provide a greater range of pedal adjustability than was before made possible. The parts and combinations of parts then used are still retained, the improvements now shown being in the nature of added parts and combinations, which make it possible to carry out more effectually the objects named.

My improved device is shown in the accompanying drawings, in which Fig. 1 presents a side elevation of the complete device, Fig. 2 a vertical, longitudinal, central section, Fig. 3 an enlarged cross section at line *a—a* of Fig. 1, Fig. 4 an enlarged cross section and partial elevation at line *b—b*, Fig. 5 a bottom view of a linking device used, Fig. 6 a transverse section of the same on line *c—c*, Fig. 7 a bottom view of my adjustable pedal extension, Fig. 8 a bottom view of my adjustable bridge for same, and Fig. 9 a top view of the floor bracket.

In the drawings, 1 is a portion of an automobile floor, 2 is an inclined forward portion of same, provided with a guide $2^a$ for accelerator-actuating rod 3, only the upper end and head of same being shown.

A bracket, adjustably mounted on floor 2 and secured by bolts $2^b$, consists of a floor plate 4 with slots $4^c$ and two up-standing, semicircular, parallel flanges $4^a$, spaced apart to receive linking device 5. Each of the flanges $4^a$ has a series of perforations $4^b$ in uniform opposed relation to the perforations in the other flange $4^a$. Linking device 5 consists of two flanges lying substantially parallel with each other and at right angles with body 5. Each flange is provided at its central portion with a slot $5^a$ and at its end portions with holes to admit pins 6 and $9^a$. These holes and the slots $5^a$ are symmetrically arranged in the respective flanges of link 5.

Link 5 is connected with bracket flanges $4^a$ by pins 6 and 7. These may be placed as shown in the drawing or pin 7 may be placed nearer pin 6 or farther away by using other pairs of the opposed holes in flanges $4^a$, slots $5^a$ being made long enough to allow such changes of position of pin 7. This gives three different positions of link 5 for the single position of pin 6 illustrated. But pin 6 may also be placed in any one of the opposing pairs of holes in flanges $4^a$, except the middle pair at the top, and at each position of pin 6 two or more adjustments of the position of link 5 may be made by corresponding changes in the position of pin 7. When pin 6 is placed in the opposing holes at the center of flanges $4^a$, at least five available positions of link 5 may be produced by the shifting of pin 7. Thus it will be seen that the outer end of the flanges of link 5, with holes to receive pin $9^a$, may be caused to assume numerous positions, higher or lower, forward or backward. This gives a wide range of adjustability, especially in connection with slots $4^c$ in floor plate 4.

8 is the forward portion of a pedal, provided with downturned flanges 9, adapted to be engaged, at two elective heights ($9^a$ or $9^b$), by pin $9^a$ and to be tiltably connected thereby to the outer end of flanges of link 5. Pedal 8 has a depressed extension 10, beyond flanges 9, adapted to receive and support heel plate 11, adjustably attached thereto by means of bolt $10^a$. These parts are more specifically described and claimed in my Patent 1,203,955, above mentioned.

An adjustable bridge plate 12 and an adjustable pedal-extension 13 are held together at their rear ends and attached under pedal 8 by means of bolt $8^b$, provided with a thumb-nut for convenience in adjusting. Flanges 8ª on the sides of pedal 8 serve to stiffen the pedal and also to retain bridge plate 12 in proper alignment, said plate 12 being made to fit slidably between the flanges 8ª.

A down-turned flange at the forward end of plate 12 is provided with a lug 12ᵇ at each side, forming a saddle of proper width to afford a secure seat for extension 13. The construction and arrangement of these parts is such as to permit forward and backward adjustment of saddle plate 12 and pedal extension 13, independently or jointly, when bolt 8ᵇ is loosened, slots 12ª and 13ª being provided for the purpose of allowing such adjustability and flanges 12ᶜ, in connection with lugs 12ᵇ, serving to prevent lateral, movement of extension 13 with relation to plate 12 and pedal 8.

My accelerator pedal as described is adapted to be attached to any automobile that is provided with a foot-power accelerator. Without some such pedal the foot used in operating the accelerator becomes greatly fatigued, especially if the accelerator button or lever is at an inconvenient distance for the person operating it. My improved pedal overcomes all such difficulties by providing a conveniently locatable and comfortable support for the foot.

From the description of the parts of my device it will be understood that numerous adjustments of distance and position of the pedal may be readily made. Slots 4ᶜ in floor plate 4 permit adjustment of the whole device forward and backward on floor 2. In each position of floor plate 4, the holes 4ᵇ in flanges 4ª permit a large number of varied positions of linking member 5. Pedal 8 may thereby be brought to almost any distance from the chauffeur's seat that is likely to be desired. Extension 13 makes it possible to set the whole device nearer said seat than it could otherwise be set. By moving bridge plate 12 forward or backward the toe end of pedal 8 may be lowered or raised to a comfortable angle. Thus it is seen that provision is made for an almost endless variety of changes in distance and position of the pedal.

As already stated, Letters Patent have been issued to me covering some of the parts used in my improved pedal.

I now claim as follows, viz:—

1. In a pedal, a foot plate tiltably mounted, a plate attached thereto underneath and adapted to be adjusted longitudinally with relation to the foot plate and to serve as an extension thereof, and, in combination therewith, a bridge plate between the foot plate and the extension plate, adapted to space said plates apart at their forward portions and to be adjusted longitudinally with relation to said plates, thereby increasing or decreasing said space.

2. The structure specified in claim 1 and, in combination therewith, means for preventing lateral motion of said bridge plate and said extension plate with relation to said foot plate and to each other.

3. An accelerator-operating rod, a foot plate tiltably mounted at its instep portion, a pivotal support for said foot plate adapted to be secured at selective distances from said rod; and an extension plate, clamped under the forward portion of said foot plate and adjustable both longitudinally and vertically with relation to same.

4. The structure specified in claim 3 and means for said vertical adjustment, said means consisting of a separator clamped between said foot plate and said extension plate forward of the clamping point of same and at a variable distance therefrom.

BENJAMIN D. ADAMS.